United States Patent
Nonogaki et al.

(10) Patent No.: US 7,234,068 B2
(45) Date of Patent: Jun. 19, 2007

(54) TRACE DATA AND POWER MEASUREMENT DATA MATCHING APPARATUS AND METHOD THAT ADDS SYNCHRONIZATION MARKERS

(75) Inventors: Nobuhiro Nonogaki, Tokyo (JP); Takashi Akiba, Tokyo (JP); Tetsuji Fukaya, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 373 days.

(21) Appl. No.: 10/920,400

(22) Filed: Aug. 18, 2004

(65) Prior Publication Data
US 2005/0044438 A1 Feb. 24, 2005

(30) Foreign Application Priority Data
Aug. 19, 2003 (JP) ............................ P2003-295416

(51) Int. Cl.
*G06F 1/30* (2006.01)
(52) U.S. Cl. ...................... 713/340; 702/186; 717/128
(58) Field of Classification Search ................ 713/340; 702/186; 717/128
See application file for complete search history.

(56) References Cited

U.S. PATENT DOCUMENTS 6,321,341 B1  11/2001  Kamijo et al.

2003/0191791 A1* 10/2003 Cyran et al. ................ 709/100
2003/0191976 A1* 10/2003 Cryan et al. ................ 713/340

FOREIGN PATENT DOCUMENTS

JP  11-24959  1/1999

OTHER PUBLICATIONS

Dejan Raskovic, Emil Jovanov, Thomas Martin, Hanief. Shuaib, Pedro Gelabert, "Energy Profiling of DSP Applications, A Case Study of an Intelligent ECG Monitor," in Proc. of DSPS Fest 2000, Aug. 2-4, 2000.*
Jason Flinn and M. Satyanarayanan, "PowerScope: a tool for profiling the energy usage of mobile applications", Second IEEE Workshop on Mobile Computing Systems and Applications, pp. 2-10, Feb. 1999.*

* cited by examiner

*Primary Examiner*—Chun Cao
*Assistant Examiner*—Albert Wang
(74) *Attorney, Agent, or Firm*—Finnegan, Henderson, Farabow, Garrett & Dunner, L.L.P.

(57) ABSTRACT

A trace data input unit inputs trace data recording execution process of a program in an equipment of inspection object. A power measurement data input unit inputs power measurement data recording a power consumption quantity of the equipment in time series. A matching unit matches the trace data with the power measurement data on the same time base, and outputs a matching result as data for power consumption analysis.

16 Claims, 6 Drawing Sheets

FIG. 1

```
#address              #address
0xc00000                      time=0
0xc0000c      ->      0xc00014
0xc00020      ->      0xc01010
0xc01030      ->      0xc00024
    ₹
0x801230      ->      0x801220
0x801230      ->      0x801220
0x801228                      time=120123
0x801230      ->      0x801220
0x801230      ->      0x801220
    ₹
```

FIG. 2

```
#time           power(mWh)
0 00            0.0
157.01          103.2
342.02          123.3
432.33          105.2
623             95.3
  ₹
119890.11       125.2
120101.22       324.2
120254.33       183.2
  ₹
```

FIG. 3

```
#address      #address
0xc00000 : time=0: TS-0000
0xc0000c -> 0xc00014
0xc00020 -> 0xc01010
0xc01030 -> 0xc00024
    ⌇
0x801230 -> 0x801220
0x801230 -> 0x801220
0x801228 : time=120123: TS-0012
0x801230 -> 0x801220
0x801230 -> 0x801220
    ⌇
```
}M1

FIG. 4

```
#time           power(mWh)
0.00            0.0   TP-0000
157.01          103.2
342.02          123.3
432.33          105.2
623             95.3
    ⌇
119890.11       125.2
120101.22       324.2  TP-0012
120254.33       183.2
    ⌇
```
}M2

FIG. 5

| #time | address | sync(address) | power | sync(power) | pgm |
|---|---|---|---|---|---|
| 0.00 | 0xc00000 | TS-0000 | 0 | TP-0000 | |
| 1.08 | 0xc00004 | | 0.6572 | | INIT-P |
| 2.16 | 0xc00008 | | 0.6572 | | INIT-P |
| 3.24 | 0xc0000c | | 0.6572 | | INIT-P |
| 4.32 | 0xc00014 | | 0.6572 | | INIT-P |
| 5.40 | 0xc00018 | | 0.6572 | | INIT-P |
| 6.48 | 0xc0001b | | 0.6572 | | INIT-P |
| 7.56 | 0xc00020 | | 0.6572 | | INIT-P |
| 8.64 | 0xc01010 | | 0.6572 | | INIT-P |
| 9.72 | 0xc01014 | | 0.6572 | | INIT-P |
| 10.80 | 0xc01018 | | 0.6572 | | INIT-P |
| 11.88 | 0xc0101b | | 0.6572 | | INIT-P |
| 12.96 | 0xc01020 | | 0.6572 | | INIT-P |
| 14.04 | 0xc01024 | | 0.6572 | | INIT-P |
| 15.12 | 0xc01028 | | 0.6572 | | INIT-P |
| 16.20 | 0xc0102b | | 0.6572 | | INIT-P |
| 17.28 | 0xc01030 | | 0.6572 | | INIT-P |
| 18.36 | 0xc00024 | | 0.6572 | | INIT-P |
| ⁘ | | | | | |
| 120098.90 | 0x80122b | | 1.5357 | | PGM-A |
| 120099.94 | 0x801220 | | 1.5357 | | PGM-A |
| 120100.99 | 0x801224 | | 1.3661 | TP-0012 | PGM-A |
| 120102.04 | 0x801228 | | 1.3661 | | PGM-A |
| 120103.09 | 0x80122b | | 1.3661 | | PGM-A |
| 120104.14 | 0x801230 | | 1.3661 | | PGM-A |
| 120105.18 | 0x801220 | | 1.3661 | | PGM-A |
| 120106.23 | 0x801224 | | 1.3661 | | PGM-A |
| 120107.28 | 0x801228 | | 1.3661 | | PGM-A |
| 120108.33 | 0x80122b | | 1.3661 | | PGM-A |
| 120109.38 | 0x801230 | | 1.3661 | | PGM-A |
| 120110.42 | 0x801220 | | 1.3661 | | PGM-A |
| 120111.47 | 0x801224 | | 1.3661 | | PGM-A |
| 120112.52 | 0x801228 | | 1.3661 | | PGM-A |
| 120113.57 | 0x80122b | | 1.3661 | | PGM-A |
| 120114.62 | 0x801230 | | 1.3661 | | PGM-A |
| 120115.66 | 0x801220 | | 1.3661 | | PGM-A |
| 120116.71 | 0x801224 | | 1.3661 | | PGM-A |
| 120117.76 | 0x801228 | | 1.3661 | | PGM-A |
| 120118.81 | 0x80122b | | 1.3661 | | PGM-A |
| 120119.86 | 0x801230 | | 1.3661 | | PGM-A |
| 120120.90 | 0x801220 | | 1.3661 | | PGM-A |
| 120121.95 | 0x801224 | | 1.3661 | | PGM-A |
| 120123.00 | 0x801228 | TS-0012 | 1.1965 | | PGM-A |
| 120124.05 | 0x80122b | | 1.1965 | | PGM-A |
| 120125.10 | 0x801230 | | 1.1965 | | PGM-A |
| 120126.14 | 0x801220 | | 1.1965 | | PGM-A |
| 120127.19 | 0x801224 | | 1.1965 | | PGM-A |
| 120128.24 | 0x801228 | | 1.1965 | | PGM-A |
| 120129.29 | 0x80122c | | 1.1965 | | PGM-A |
| 120130.34 | 0x801230 | | 1.1965 | | PGM-A |

TRACE DATA AND POWER MEASUREMENT DATA MATCHING APPARATUS AND METHOD THAT ADDS SYNCHRONIZATION MARKERS

CROSS-REFERENCE TO RELATED APPLICATIONS

This application is based upon and claims the benefit of priority from prior Japanese Patent Application P2003-295416, filed on Aug. 19, 2003; the entire contents of which are incorporated herein by reference.

FIELD OF THE INVENTION

The present invention relates to a trace data processing apparatus and method for creating data usable for power consumption analysis of an electronic equipment.

BACKGROUND OF THE INVENTION

In recent years, portable electronic equipment (battery-drivable) such as a cellular-phone or a PDA (Personal Digital Assistants) terminal is widely used. This kind of electronic equipment prepares various mechanism of power saving to extend battery life. Furthermore, in order to reduce useless power consumption, analysis method of power consumption is variously developed. For example, one method is disclosed in Japanese Patent Disclosure (Kokai) PH11-202984 (U.S. Pat. No. 6,321,341).

In this reference, an apparatus for analyzing power consumption detects a power control signal (representing a control instruction related to a power consumption) issued from a computer as an inspection object to various devices, and measures a signal related to a power consumption of a predetermined device and a signal related to a power consumption of the computer. Relation between the power control signal and the power consumption is made clear based on detected signals.

By operating the power consumption analysis of this apparatus, a clue to determine control steps of the power control signal to maximally show the power saving effect can be obtained. Accordingly, working to last the battery long can be effectively realized.

On the other hand, semiconductor manufacture techniques continue to improve. In the electronic equipment such as the cellular-phone or the PDA terminal, a device including a processor is manufactured as one chip scale. Accordingly, detection of the power control signal and measurement of the power consumption of each device are useless in this kind of electronic equipment. Furthermore, signal lines to externally output signals related to the power control signal and the power consumption are not originally laid in the electronic equipment.

Furthermore, a request for high function of this electronic equipment goes on rising, and software loaded onto the electronic equipment has a tendency to increase and complicate. In such situation, the power control signal is indirectly activated because the software is hierarchically structured. Accordingly, even if the power control signal is detected, the relation between the power control signal and the software operation is not make clear.

As mentioned-above, in the apparatus for analyzing power consumption of the prior art, it is difficult to analyze the relation between the software operation and the power consumption quantity of the electronic equipment such as the cellular-phone and the PDA terminal.

SUMMARY OF THE INVENTION

The present invention is directed to a trace data processing apparatus and a method to create data for analyzing the relation between the program operation and the power consumption quantity in an inspection object.

According to an aspect of the present invention, there is provided an apparatus for processing trace data, comprising: a trace data input unit configured to input trace data recording execution process of a program in an inspection object; a power measurement data input unit configured to input power measurement data recording a power consumption quantity of the inspection object in time series; and a matching unit configured to match the trace data with the power measurement data on the same time base, and to output a matching result as data for power consumption analysis.

According to another aspect of the present invention, there is also provided a method for processing trace data, comprising: inputting trace data recording execution process of a program in an inspection object; inputting power measurement data recording a power consumption quantity of the inspection object in time series; matching the trace data with the power measurement data on the same time base; and outputting a matching result as data for power consumption analysis.

According to still another aspect of the present invention, there is also provided a computer program product, comprising: a computer readable program code embodied in said product for causing a computer to process trace data, said computer readable program code comprising: a first program code to input trace data recording execution process of a program in an inspection object; a second program code to input power measurement data recording a power consumption quantity of the inspection object in time series; a third program code to match the trace data with the power measurement data on the same time base; and a fourth program code to output a matching result as data for power consumption analysis.

BRIEF DESCRIPTION OF THE DRAWINGS

FIG. 6 is one example of trace matching data created from the trace data and the power measurement data according to the present embodiment.

DETAILED DESCRIPTION OF THE EMBODIMENTS

Figure 1:
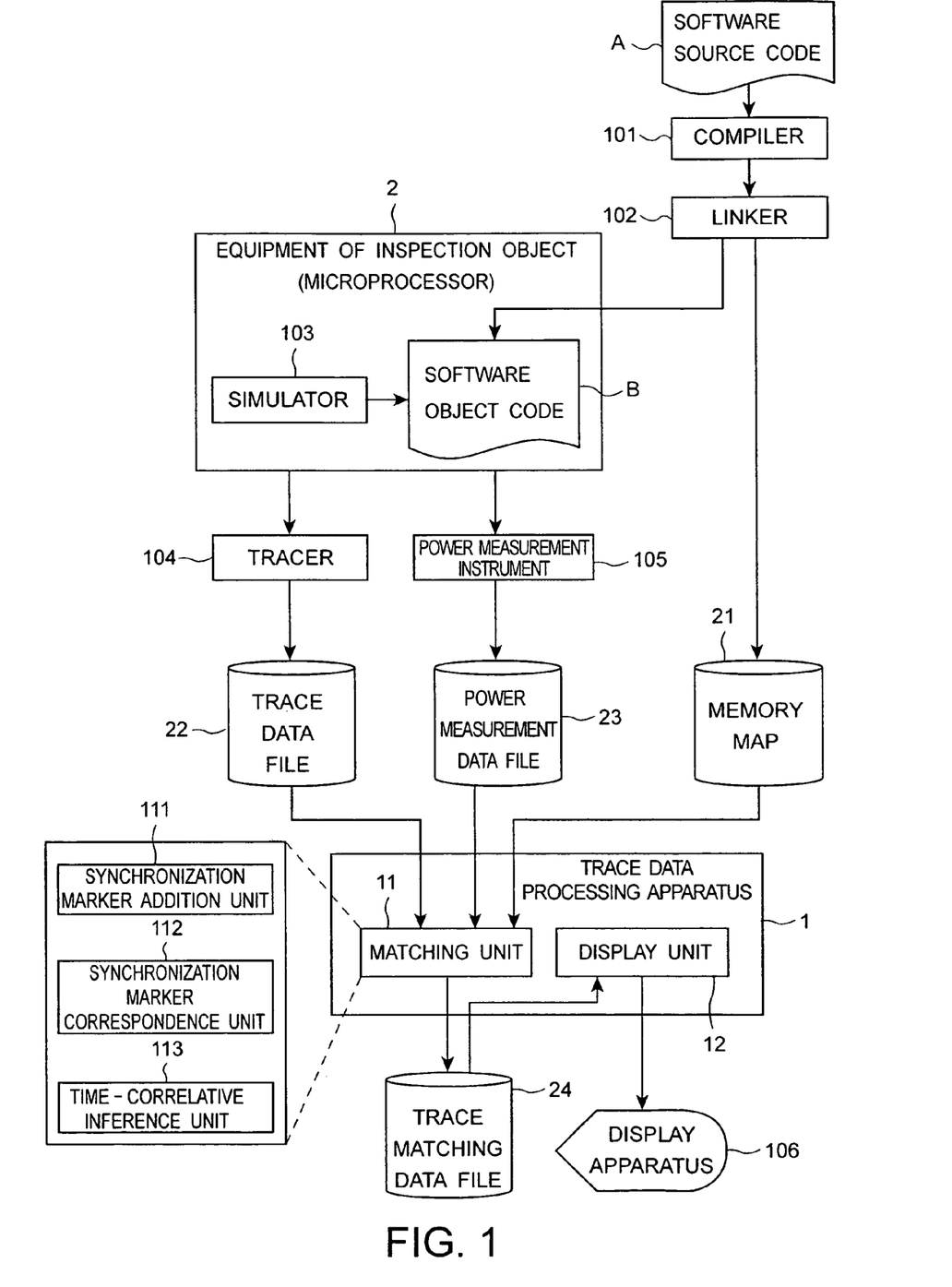
FIG. 1 is a block diagram of the trace data processing apparatus in an operation environment according to one embodiment of the present invention.

Hereinafter, various embodiments of the present invention will be explained by referring to the drawings. FIG. 1 is a block diagram of the trace data processing apparatus in an operation environment according to one embodiment of the present invention.

The trace data processing apparatus 1 of the present embodiment is, for example, a tool to support a power consumption analysis of the software in the equipment 2 of inspection object such as a cellular-phone. The trace data processing apparatus creates data to analyze the relation between the software operation and the power consumption in the equipment 2 of inspection object.

As shown in FIG. 1, software source code A to be installed into the equipment 2 of inspection object is compiled by a compiler 101, and an object module is created. This object module is linked by a linker 102, and a load module is created. This load module created by the linker 102 is installed into the equipment 2 of inspection object as a software object code B. Furthermore, in the case of linking by the linker 102, a memory map 21 representing a location of each code of the software object code B in address space is created.

Furthermore, in this equipment 2 of inspection object, in addition to the software object code B, a simulator 103 to have the software object code B recognize that some operation for the equipment 2 is executed is provisionally installed for inspection. In inspection of the equipment 2, while the simulator 103 has the software object code B execute various operations, a tracer 104 obtains trace data and the trace data is stored in a trace data file 22. Furthermore, a power measurement instrument 105 obtains power measurement data and the power measurement data is stored in a power measurement data file 23. In a situation that an actual operation for the equipment 2 has the software object code B execute a desired operation, the simulator 103 is not necessary. If this situation is more effective, the actual operation is used for inspection of the equipment 2. Furthermore, the simulator 103 and the actual operation may be used for inspection of the equipment 2. Concretely, while the simulator 103 has the software object code B execute a desired operation, the tracer 104 obtains the trace data. On the other hand, while the equipment 2 has the software object code B execute the desired operation, the power measurement instrument 105 obtains the power measurement data.

Whenever the equipment 2 executes instruction of software, the tracer 104 outputs information as the trace data. As a result, execution process of the software object code B in the equipment 2 is recorded in the trace data file 22. On the other hand, the power measurement instrument 105 periodically measures the power consumption quantity of the equipment 2, and outputs the measurement result as the power measurement data. As a result, the power consumption quantity of the equipment 2 is recorded in the power measurement data file 23 in time series.

The trace data processing apparatus 1 inputs the trace data obtained by the tracer 104 and the power measurement data obtained by the power measurement instrument 105, creates data for power consumption analysis (trace matching data) by matching the trace data of the trace data file 22 with the power measurement data of the power measurement data file 23 on the same time base, and the trace matching data is stored in a trace matching data file 24. Furthermore, the trace data processing apparatus 1 outputs the trace matching data through a display apparatus 106. In order to execute these processing, the trace data processing apparatus 1 includes a matching unit 11 and a display unit 12. Furthermore, the matching unit 11 includes a synchronization marker addition unit 111, a synchronization marker correspondence unit 112, and a time-correlative inference unit 113. Hereinafter, data stored in the trace data file 22 is called the trace data 22, data stored in the power measurement data file 23 is called the power measurement data 23, and data stored in the trace matching data file 24 is called the trace matching data 24.

As used herein, those skilled in the art will understand that the term "unit" is broadly defined as a processing device (such as a server, a computer, a microprocessor, a microcontroller, a specifically programmed logic circuit, an application specific integrated circuit, a discrete circuit, etc.) that provides the described communication and functionally desired. While such a hardware-based implementation is clearly described and contemplated, those skilled in the art will quickly recognize that a "unit" may alternatively be implemented as a software module that works in combination with such a processing device. In addition, one processing device may comprise one or more than one unit. Similarly, "a memory" may refer to one physical memory or several "memories" may be configured on one physical unit. Depending on the implementation constraints, such a software module or processing device may be used to implement more than one "unit" as disclosed and described herein. Those skilled in the art will be familiar with particular and conventional hardware suitable for use when implementing an embodiment of the present invention with a computer or other processing device. Likewise, those skilled in the art will be familiar with the availability of different kinds of software and programming approaches suitable for implementing one or more "units" as one or more software modules.

Figure 2:
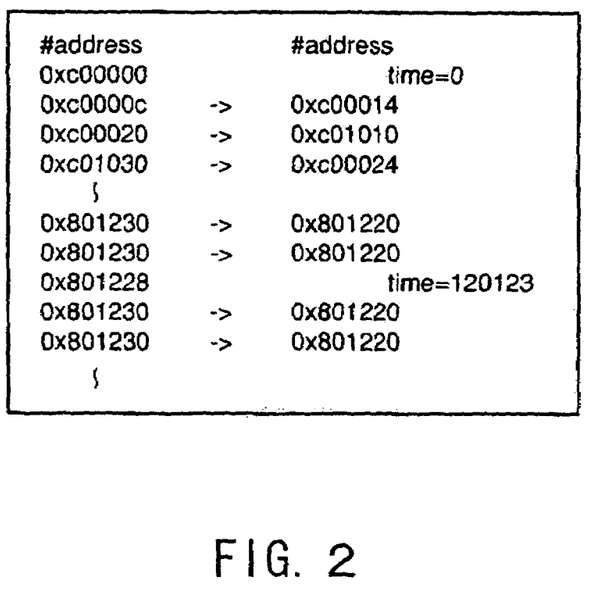
FIG. 2 is one example of trace data input to the trace data processing apparatus according to the present embodiment.
Figure 3:
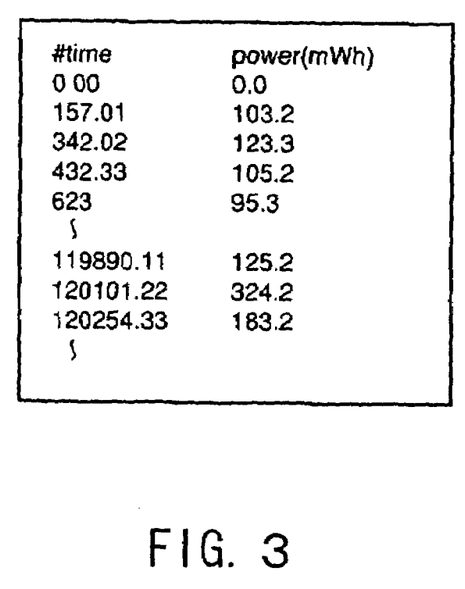
FIG. 3 is one example of power measurement data input to the trace data processing apparatus according to the present embodiment.

FIG. 2 shows one example of the trace data 22 obtained by the tracer 104, and FIG. 3 shows one example of the power measurement data 23 obtained by the power measurement instrument 105. The trace data 22 in FIG. 2 and the power measurement data 23 in FIG. 3 are obtained at the same timing of inspection for the same equipment 2 of inspection object. As shown in FIG. 2, an address of each instruction code is recorded in order of execution in the trace data 22. On the other hand, as shown in FIG. 3, the power consumption quantity periodically measured is recorded in time series in the power measurement data 23.

The matching unit 11 in the equipment 1 inputs the trace data 22 and the power measurement data 23. First, the synchronization marker addition unit 111 respectively adds a synchronization marker as a time stamp to the trace data 22 and the power measurement data 23. A value of the time stamp may be an absolute time when each datum is obtained, or may be a relative time as elapsed period from some basis timing. As shown in the trace data 22 of FIG. 2, in the case that time information is periodically or arbitrarily embedded to the datum, the synchronization marker addition unit 111 adds the synchronization marker to a position of the time information in the trace data 22. On the other hand, as shown in the power measurement data 23 of FIG. 3, in the case that time information is already added to each output value (power consumption quantity), the synchronization marker addition unit 111 adds the synchronization marker to the time information at a predetermined period.

Figure 4:
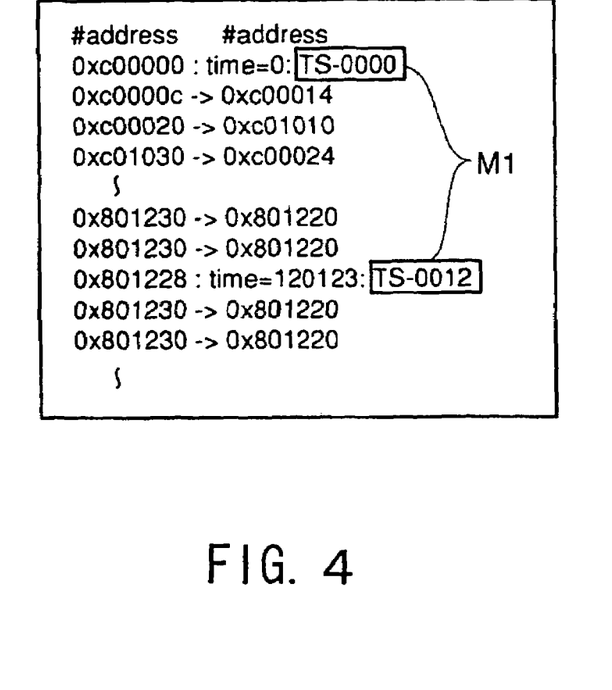
FIG. 4 is one example of the trace data to which synchronization markers are added according to the present embodiment.
Figure 5:
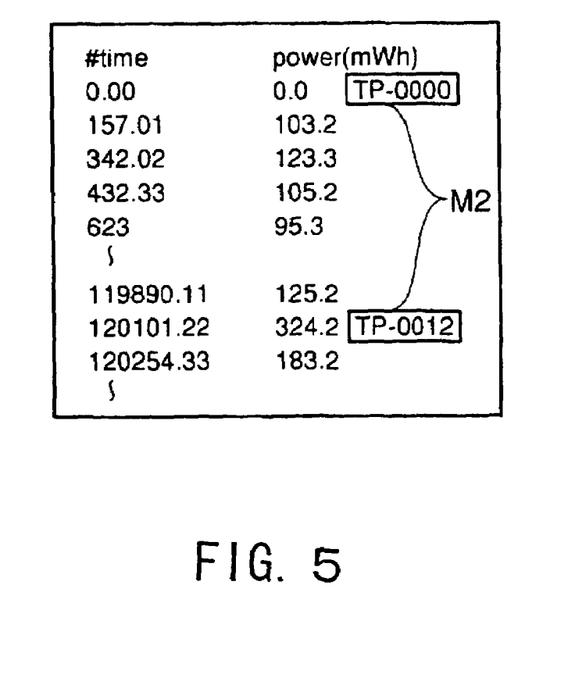
FIG. 5 is one example of the power measurement data to which synchronization markers are added according to the present embodiment.

FIG. 4 shows the trace data 22 of FIG. 2 to which the synchronization marker is added by the synchronization marker addition unit 111. FIG. 5 shows the power measurement data 23 of FIG. 3 to which the synchronization marker is added by the synchronization marker addition unit 111. As shown in FIG. 4, in the trace data 22 in which time information is periodically or arbitrarily embedded, the synchronization marker (M1) is added to a position of the time information. On the other hand, as shown in FIG. 5, in the power measurement data 23 in which time information is added to each output value, the synchronization marker (M2) is added to a position of time information corresponding to a predetermined period.

Furthermore, even if time information does not exist in the data, at least two timings of a start time and a completion time when the data is obtained are recorded. Accordingly, the synchronization marker addition unit 111 estimates a suitable time from the two timings, and adds the synchronization marker to the suitable time of the data. Addition method of the synchronization marker is not limited to any method, and various methods can be applied.

After the synchronization marker is added to the trace data 22 and the power measurement data 23, the synchronization marker correspondence unit 112 searches time information of the power measurement data 23 which is almost the same as time information of the marker (M1) of the trace data 22, and searches time information of the trace data 22 which is almost the same as time information of the marker (M2) of the power measurement data 23. After each time information is searched from the trace data 22 and the power measurement data 23, the synchronization marker correspondence unit 112 corresponds the marker (M1) of the trace data 22 with the searched time information of the power measurement data 23, and corresponds the marker (M2) of the power measurement data 23 with the searched time information of the trace data 22. The synchronization marker addition unit 23 can independently execute addition of the marker to trace data 22 and addition of the marker to the power measurement data 23 because the synchronization marker correspondence unit 112 executes correspondence of each marker with the same time information between the trace data 22 and the power measurement data 23.

After each marker and the same time information are corresponded between the trace data 22 and the power measurement data 23, the time-correlative inference unit 113 equally adjusts a number of data in the trace data 22 and a number of data in the power measurement data 23 on the same time base. Concretely, a marker (M1) of the trace data 22, a marker (M2) of the power measurement data 23, time information (T) of the trace data 22 which is corresponded with the marker (M2), and time information (T2) of the power measurement data 23 which is corresponded with marker (M1) are extracted. Assume that a number of data (address) included between the marker (M1) and the time information (T1) in the trace data 22 is P, and a number of data (power consumption quantity) included between the marker (M2) and the time information (T2) in the power measurement data 23 is Q. In this case, the number of data included is respectively increased in proportion to a ratio of each number of the trace data 22 and the power measurement data 23. Concretely, the number of data (P) in the trace data 22 is multiplied by Q, and the number of data (Q) in the power measurement data 23 is multiplied by P. For example, in the case that a number of data of the power measurement data 23 is trebled, each value of the power consumption quantity is reduced as one third, and each value ($1/3$) is arranged by three units ($1/3$, $2/3$, 1). Alternatively, if elapsed period in the trace data 22 and the power measurement data 23 is adjusted, any method can be applied.

After adjustment by the time-correlative inference unit 113 is completed, the matching unit 11 outputs trace matching data 24 by matching the trace data 22 with the power measurement data 23 on the same time base. FIG. 6 shows one example of the trace matching data 24 output from the matching unit 11, which is created from the trace data 22 of FIG. 2 and the power measurement data 23 of FIG. 3.

In the trace matching data 24 of FIG. 6, the power consumption quantity of the equipment 2 is displayed in correspondence with execution process of the software object code B of the equipment 2. In other words, the trace data processing unit 1 presents data for power consumption analysis useful for analyzing the relation between the software operation and the power consumption quantity.

The field on the right side of the trace matching data 24 of FIG. 6 displays the type of program (a function unit of execution process) to which each code belongs (INIT-P, PGM-A). This is one optional function prepared by the matching unit 11 (and the display unit 12). By referring to the memory map 21 created by the linker 102, the matching unit 11 obtains the type of program corresponding to an address of each code recorded in the trace data 22, and records the type of program through the display unit 12. This function is persistently optional. Main function of the trace data processing apparatus 1 is a matching process of the trace data 22 with the power measurement data 23 on the same time base.

Furthermore, in FIG. 6, a position of the marker (TS-0012) added to the trace data 22 is different from a position of the marker (TP-0012) added to the power measurement data 23. This marker is persistently a standard for matching. In the case of adjustment by the time-correlative inference unit 113, an inferred result obtained from actual data has priority over a correspondence result of the marker by the synchronization marker correspondence unit 112. A time lag between markers (TS-0012, TP-0012) in FIG. 6 occurs because of priority of the inferred result obtained from actual data.

The display unit 12 of the trace data processing unit 1 presents the trace matching data 24 through the display apparatus 106. The display unit 12 reads the trace matching data stored in the trace matching data file 24 and the type of program (corresponding to the address of each code) obtained by the matching unit 11. The display unit 12 adds the type of program to the corresponding address in the trace matching data, discriminately adds addresses with some colors in the trace matching data, and supplies the trace matching data 24 including the type of program and the colors to the display apparatus 106. The colors discriminately indicate addresses of which power consumption quantities are almost same values. Briefly, the same color is uniquely added to the addresses of which power consumption quantities are almost same values. In this case, a user watches the colored (and the added type of program) trace matching data 24 on the display apparatus 106, and can visually recognize the relation between the operation of the software object code B and the power consumption quantity in the equipment 2 of inspection object.

Figure 7:
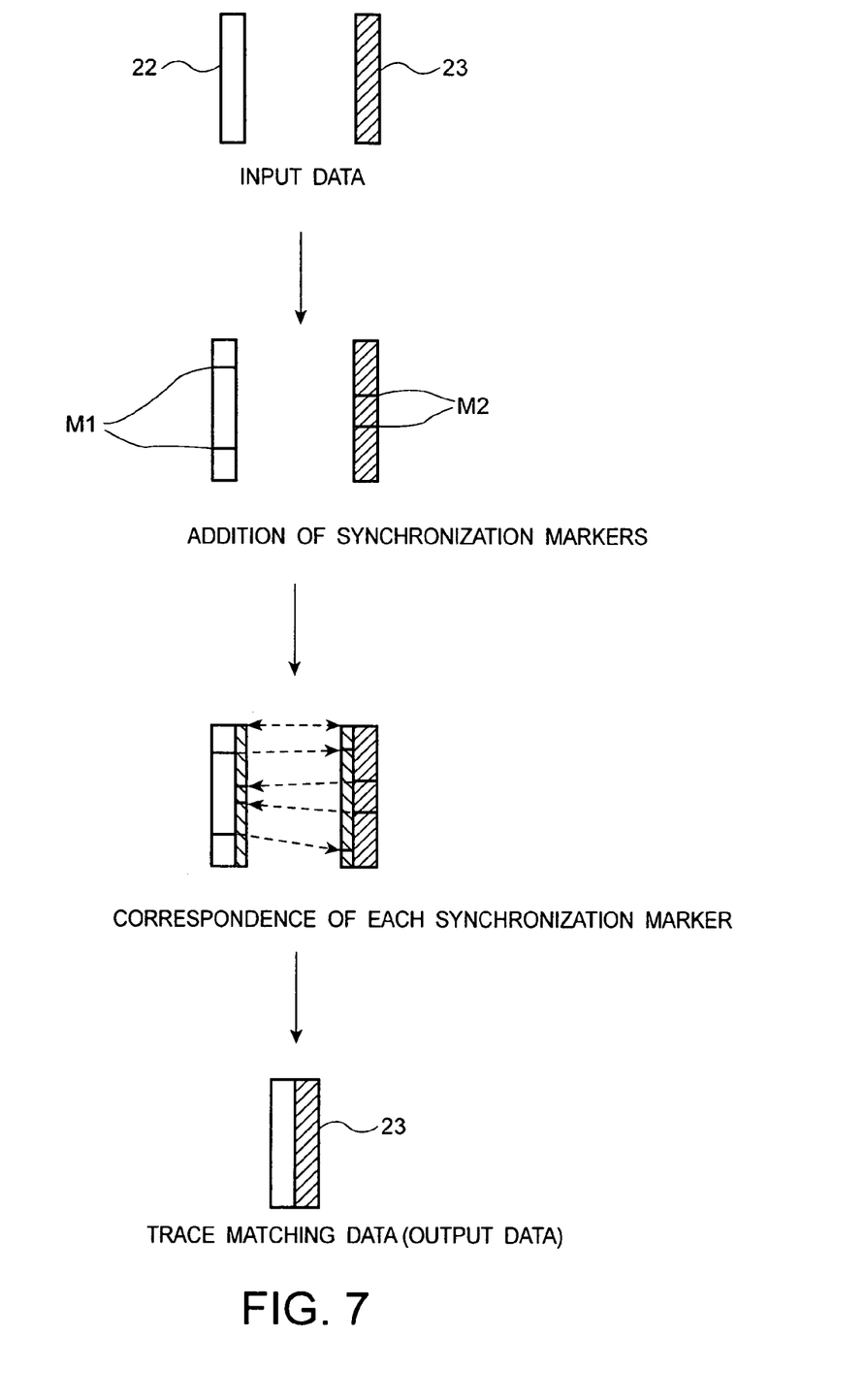
FIG. 7 is a schematic diagram of transition of data processed by the trace data processing apparatus according to the present embodiment.
Figure 8:
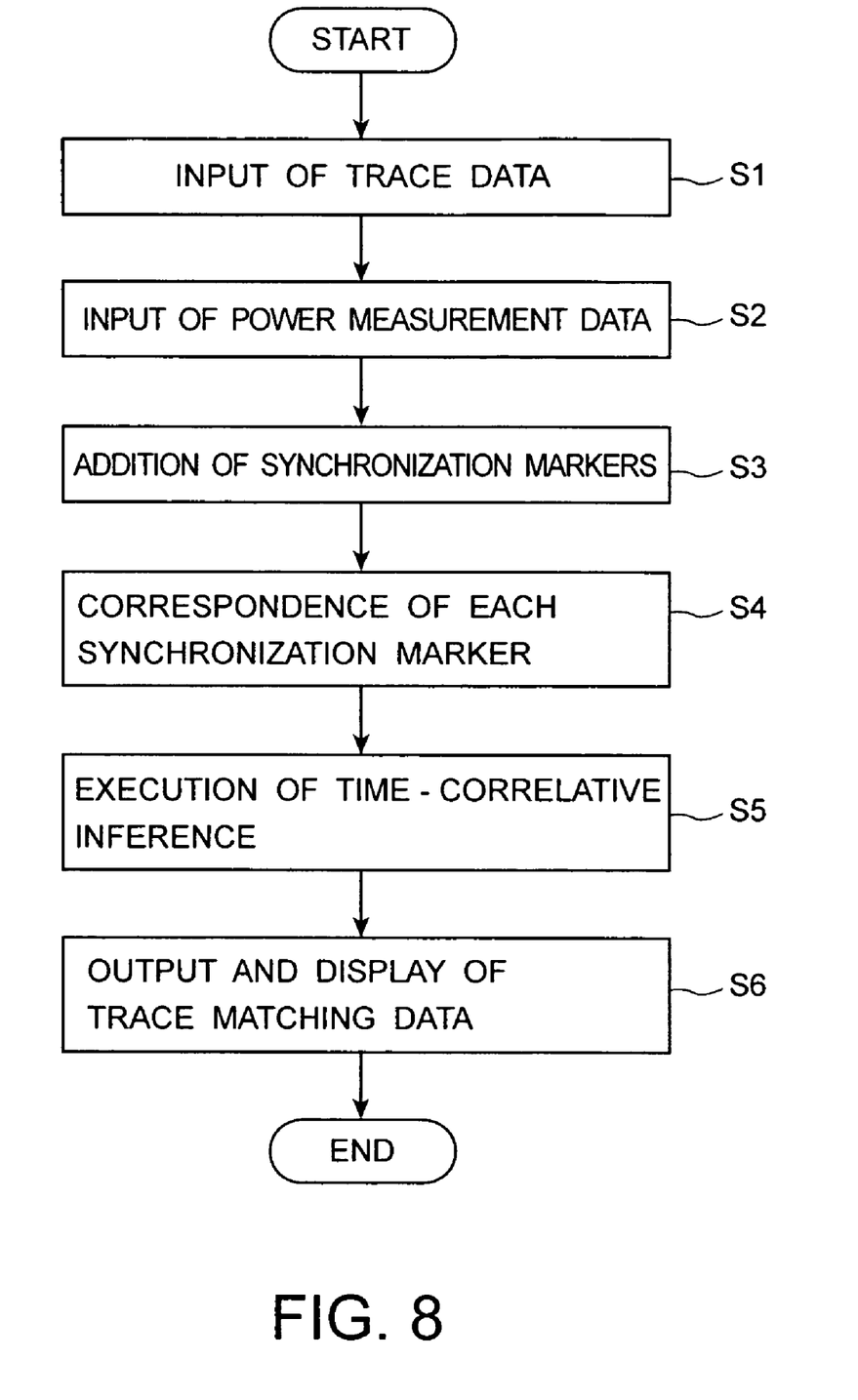
FIG. 8 is a flow chart of processing of the trace data processing apparatus according to the present embodiment.

FIG. 7 is a schematic diagram of transition of data processed by the trace data processing apparatus 1 according to the present embodiment. FIG. 8 is a flow chart of processing of the trace data processing apparatus 1 according to the present embodiment.

First, the trace data 22 obtained by the tracer 104 and the power measurement data 23 obtained by the power measurement instrument 105 are input to the trace data processing apparatus 1 (The most upper part of FIG. 7, S1~S2 of FIG. 8). Then, a synchronization marker is respectively added to the trace data 22 and the power measurement data 23 (The second upper part of FIG. 7, S3 of FIG. 8).

Next, correspondence of each synchronization marker with the same time information is executed between the trace data 22 and the power measurement data 23 (The third upper part of FIG. 7, S4 of FIG. 8). Based on the correspondence result of each synchronization marker, the trace data 22 is matched with the power measurement data 23 by adjusting an elapsed period (a number of data in correspondence periods between the trace data 22 and the power measurement data 23), and the trace data processing apparatus 1 outputs the matching result as the trace matching data 24 (The most lower part of FIG. 7, S5~S6 of FIG. 8).

As mentioned-above, in this trace data processing apparatus, the trace matching data 24 useful as the data for power consumption analysis can be presented. Briefly, by referring to the trace matching data 24, the relation between the operation of the software object code B and the power consumption quantity in the equipment 2 of inspection object can be analyzed.

In the above-mentioned embodiment, on the assumption that the synchronization marker correspondence unit 112 exists, the synchronization marker addition unit 111 independently adds a synchronization marker to the trace data 22 and the power measurement data 23 irrespective of the same time base. However, in the case of adding the synchronization marker, correspondence between the trace data 22 and the power measurement data 23 may be executed on the same time base.

For example, in the trace data 22 of FIG. 2, time information is periodically or arbitrarily recorded. On the other hand, in the power measurement data 23 of FIG. 3, time information is respectively recorded for each datum. In this case, a marker is added to a position of the time information in the trace data 22. By searching time information corresponding to the marker on the same time base from the power measurement data 23, a marker is added to a position of the searched time information in the power measurement data 23.

Furthermore, even if time information is not recorded in both data at all, at least two timings of a start time and a completion time when data is obtained can be recorded. Accordingly, by estimating a suitable time from the two timings in one data, a marker is added to a position of the estimated time information in the one data, and a marker is added to a position of time information which is almost the same as the estimated time information in the other data. In this case, if time information is not recorded in the other data at all, as mentioned-above, at least two timings of a start time and a completion time when the other data is obtained can be recorded. Accordingly, time information which is almost the same as the estimated-time information of the one data is searched using the two timings in the other data, and a marker is added to a position of the searched time information in the other data.

Furthermore, if time information is respectively recorded in both data, a marker is respectively added to a position of time information in both data at a predetermined period. In the case that the synchronization marker addition unit 111 has these functions, the synchronization marker correspondence unit 112 is not necessary.

As mentioned-above, in the trace data processing apparatus and method of the present invention, data for power consumption analysis is created by adjustably matching trace data and power measurement data to the same time base. Accordingly, by referring to the data for power consumption analysis, the relation between the program operation and the power consumption quantity in the equipment of inspection object can be made clear.

For embodiments of the present invention, the processing of the present invention can be accomplished by a computer-executable program, and this program can be realized in a computer-readable memory device.

In embodiments of the present invention, the memory device, such as a magnetic disk, a floppy disk, a hard disk, an optical disk (CD-ROM, CD-R, DVD, and so on), an optical magnetic disk (MD and so on) can be used to store instructions for causing a processor or a computer to perform the processes described above.

Furthermore, based on an indication of the program installed from the memory device to the computer, OS (operation system) operating on the computer, or MW (middle ware software), such as database management software or network, may execute one part of each processing to realize the embodiments.

Furthermore, the memory device is not limited to a device independent from the computer. By downloading a program transmitted through a LAN or the Internet, a memory device in which the program is stored is included. Furthermore, the memory device is not limited to one. In the case that the processing of the embodiments is executed by a plurality of memory devices, a plurality of memory devices may be included in the memory device. The component of the device may be arbitrarily composed.

In embodiments of the present invention, the computer executes each processing stage of the embodiments according to the program stored in the memory device. The computer may be one apparatus such as a personal computer or a system in which a plurality of processing apparatuses are connected through a network. Furthermore, in the present invention, the computer is not limited to a personal computer. Those skilled in the art will appreciate that a computer includes a processing unit in an information processor, a microcomputer, and so on. In short, the equipment and the apparatus that can execute the functions in embodiments of the present invention using the program are generally called the computer.

Other embodiments of the invention will be apparent to those skilled in the art from consideration of the specification and practice of the invention disclosed herein. It is intended that the specification and examples be considered as exemplary only, with the true scope and spirit of the invention being indicated by the following claims.

What is claimed is:

1. An apparatus for processing trace data, comprising:
   a trace data input unit configured to input trace data recording an execution process of a program in an inspection object;
   a power measurement data input unit configured to input power measurement data recording a power consumption quantity of the inspection object in time series; and
   a matching unit configured to match the trace data with the power measurement data on the same time base, and to output a matching result as data for power consumption analysis;
   wherein said matching unit includes a synchronization marker addition unit configured to add markers to the trace data and the power measurement data, a synchronization marker correspondence unit configured to correspond a marker of one of the trace data and the power measurement data with a datum of the other of the trace data and the power measurement data on the same time base, and a time-correlative inference unit configured to equally adjust a number of data between two markers in one of the trace data and the power measurement data and a number of data between two data corresponding to the two markers in the other of the trace data and the power measurement data.

2. The apparatus according to claim 1,
wherein said matching unit correspondingly adds information discriminating a function unit of the execution process to the data for power consumption analysis.

3. The apparatus according to claim 2,
further comprising a display unit configured to discriminately color the execution processes of which power consumption quantities are almost same values with the same color, and to output the data for power consumption analysis including the information and the color to an outside display apparatus.

4. The apparatus according to claim 1,
wherein the trace data includes an address of each instruction code of the program in order and time information at an execution timing of an arbitrary instruction code.

5. The apparatus according to claim 4,
wherein the power measurement data respectively includes the power consumption quantity and time information when the power consumption quantity is periodically measured.

6. The apparatus according claim 5,
wherein said synchronization marker addition unit adds a first marker to the time information in the trace data, and adds a second marker to the time information corresponding to a predetermined interval in the power measurement data.

7. The apparatus according to claim 6,
wherein said synchronization marker correspondence unit corresponds the first maker with the power consumption quantity of the power measurement data of which time information is almost the same as the time information of the first marker of the trace data, and corresponds the second marker with the address of the trace data of which time information of the second marker of the power measurement data.

8. The apparatus according to claim 7,
wherein said time-correlative inference unit coincides a number of addresses between the first marker and the address corresponding to the second marker in the trace data with a number of power consumption quantities between he second marker and the power consumption quantity corresponding to the first maker ion the power measurement data.

9. A method for processing trace data, comprising:
inputting trace data recording an execution process of a program in an inspection object;
inputting power measurement data recording a power consumption quantity of the inspection object in time series;
matching the trace data with the power measurement data on the same time base; and
outputting a matching result as data for power consumption analysis, wherein the step of matching further comprises:
adding markers to the trace data and the power measurement data;
corresponding a marker of one of the trace data and the power measurement data with a datum of the other of the trace data and the power measurement data on the same time base; and
equally adjusting a number of data between two markers in one of the trace data and the power measurement data and a number of data between two data corresponding to the two markers in the other of the trace data and the power measurement data.

10. The method according to claim 9, wherein the step of matching further comprises:
correspondingly adding information discriminating a function unit of the execution process to the data for power consumption analysis.

11. The method according to claim 10, further comprising:
discriminately coloring the execution processes of which power consumption quantities are almost same values with the same color; and
outputting the data for power consumption analysis including the information and the color to an outside display apparatus.

12. The method according to claim 9,
wherein the trace data includes an address or each instruction code of the program in order and time information at an execution timing of an arbitrary instruction code.

13. The method according to claim 12,
wherein the power measurement data respectively includes the power consumption quantity and time information when the power consumption quantity is periodically measured.

14. The method according to claim 13, wherein the step of adding further comprises:
adding a first marker to the time information in the trace data; and
adding a second marker to the time information corresponding to a predetermined interval in the power measurement data.

15. The method according to claim 14, wherein the step of corresponding further comprises:
corresponding the first maker with the power consumption quantity of the power measurement data of which time information is almost the same as the time information of the first marker of the trace data; and
corresponding the second marker with the address of the trace data of which time information is almost the same as the time information of the second marker of the power measurement data.

16. The method according to claim 15, wherein the step of adjusting further comprises:
coinciding a number of addresses between the first marker and the address corresponding to the second marker in the trace data with a number of power consumption quantities between the second marker and the power consumption quantity corresponding to the first marker in the power measurement data.

* * * * *